United States Patent [19]

Mandell, Jr.

[11] 3,900,606

[45] Aug. 19, 1975

[54] TEMPORARY SOIL RELEASE RESINS APPLIED TO FABRICS BY SPRAYING

[75] Inventor: Harry Creston Mandell, Jr., Wayne, Pa.

[73] Assignee: Pennwalt Corporation, Philadelphia, Pa.

[22] Filed: Oct. 17, 1973

[21] Appl. No.: 407,115

Related U.S. Application Data

[62] Division of Ser. No. 171,362, Aug. 12, 1971, Pat. No. 3,782,898.

[52] U.S. Cl. ............................... 427/155; 427/421
[51] Int. Cl. ............................................. B44d 1/22
[58] Field of Search ............... 117/66, 143 A, 104 R, 117/161 UC, 139.5 A, 161 UH, 161 UB, 117/161 UF, 138.8 F; 260/29.6 RW, 29.6 H

[56] References Cited
UNITED STATES PATENTS

| 2,692,182 | 10/1954 | Nuessle et al. | 117/161 UB |
| 2,807,865 | 10/1957 | Shippee et al. | 117/139.5 A |
| 3,236,685 | 2/1966 | Caldwell et al. | 117/139.5 A |
| 3,377,249 | 4/1968 | Marco | 8/115.6 |
| 3,448,462 | 6/1969 | Thomas | 117/161 UB |
| 3,575,899 | 4/1971 | Pryor et al. | 117/139.5 C |

Primary Examiner—Ralph Husack
Assistant Examiner—Theodore G. Davis
Attorney, Agent, or Firm—Robert G. Danehower

[57] ABSTRACT

A laundering process and novel laundering composition used to impart temporary soil release properties to textile fabrics by impregnating the fabrics with an acrylic resin in the final step of a laundering operation, usually in the sour operation. The fabrics are then dried leaving a residue of the resin on the fabrics which helps remove after acquired stains. The resin impregnation can be combined with fabric finishing treatments such as blueing, sizing, brightening and softening. The process is repeated with each subsequent laundering of the fabrics to obtain optimum soil release and stain removal.

The laundering compositions comprise water, acrylic resin, and laundry sour or other fabric finishing agent.

4 Claims, No Drawings

TEMPORARY SOIL RELEASE RESINS APPLIED TO FABRICS BY SPRAYING

This is a division of application Ser. No. 171,362, filed Aug. 12, 1971 now U.S. Pat. No. 3,782,898.

BRIEF SUMMARY OF THE INVENTION

Deeply set grease and oil stains have proved difficult to remove by laundering, especially in the synthetic fabrics made of polyester or mixtures of polyester and cotton. In accordance with this invention, I have discovered a method of treating textile fabrics with acrylic resins in the final stage of the laundering process which impregnates the fabrics with the resins to provide temporary soil release characteristics. The resin impregnation of the fabrics assists in the removal of deeply set stains and at the same time the fabric acquires soil resistant properties so that any substantially acquired stain does not become deeply and permanently attached. The impregnated resin is largely removed in the next laundering of the fabric so that a new application of the resin must be made on each subsequent laundering to obtain and maintain optimum soil release capability.

The acrylic resins are added to the last stage of the laundering cycle which is usually the sour operation. Moreover, the resins could be added to other fabric finishing treatments such as blueing, sizing, brightening or softening provided it is in the last operation. The concentration of the resin in the sour or other finishing solution will be an amount so that the quantity of resin left on the fabric after drying will provide an effectual means for removing soil and stains. This is known as an effective amount of acrylic resin. Generally, the concentration of the resin in the treating composition will be at least one-quarter part resin per 5,000 parts by weight of souring solution or other treating solution such as blueing, or sizing. A preferred concentration range is one-half to 1 part of resin per 5,000 parts of sour, or other treating solution while concentrations as high as 3 parts of resin per 5,000 parts of treating solution have been used for reclamation of deeply soiled garments.

The acrylic resin is generally an aqueous solution although some resins may be in the form of aqueous emulsions. The pH of the resin treating solution must be within the range of 4 to 6.5, preferably within a range of 4.5 to 6.0. The temperature during the impregnation treatment is not critical but is usually within the range of 70° to 180°F, preferably within the range of 95° to 180°F. These conditions of temperature and pH apply to either souring liquids or other fabric finishing treatment solutions in which the acrylic resin is suspended or is in solution.

The resin treating solutions are separated from the fabrics by conventional laundry practice leaving the fabrics wet and impregnated with resin. The fabrics are then dried by conventional laundry practice leaving the resin on the fabrics. Drying temperatures of 70° to 350°F are satisfactory. The amount of resin left on the fabric after drying is in the order of 0.005 to 0.05 percent by weight. A preferred amount of resin is 0.01 to 0.02 percent by weight on a dry basis.

Thus, the retained resin acts as a parting layer or film for subsequently acquired stains permitting their easy removal in subsequent laundering operations. The removal of the resin itself in subsequent laundering operations further increases the removal of soil and stains. Additionally, the impregnated resin attacks deeply seated stains and greases already present so that repeated treatments with the resin eventually restore a badly soiled fabric to a usable condition. Generally, about three launderings including a resin treatment in each cycle are required to restore a fabric. The acrylic resins used in my process are mixtures of one or more homopolymers and copolymers obtained from acrylic acid or methacrylic acid, and alkyl esters of acrylic acid and methacrylic acid.

The resin treating process is thoroughly compatible with present day laundering, and normal laundering conditions of temperature and detergent concentration for washing and rinsing precede the resin treatment of the fabrics.

Also in accordance with my invention, I have discovered novel resin compositions for treating fabrics during laundering to give them temporary soil release characteristics. These compositions comprise the acrylic resins discussed above in aqueous mixtures with laundry sours and/or fabric finishing agents such as blues, brighteners, sizing agents and softeners.

In a laundry souring solution, sufficient souring chemical must be present to give a pH within the range of 4 to 6.5 preferably within the range of 4.5 to 6.0. The same conditions of pH and acrylic resin concentration apply to other fabric finishing compositions comprising water, resin and fabric finishing agent such as blueing, sizing, brightener, or softener.

In another aspect of my invention, the acrylic soil release resin may be applied by spray to a textile fabric which has previously been dried. The spray propellant may be air, carbon dioxide, hydrocarbons or fluorocarbons. The fabrics are dried after spraying to remove the spray liquid. The clothes may be dried on racks or by tumbling in an air-clothes dryer or by ironing. Drying temperatures may vary from room temperature to 350°F. Example 8 is illustrative of this aspect of my invention.

DETAILED DESCRIPTION OF THE INVENTION

In recent years the use of fabrics which are made from blends of different textile fabrics has become increasingly common. One of the more popular of these mixtures is polyester with cotton fiber in a ratio frequently containing from 50 to 90 percent polyester. These fabrics are frequently treated to provide improved strength to the cotton portion, to improve hand or quality of texture, to provide permanent press characteristics and to provide soil release characteristics.

It has been commonly observed that polyester and other synthetic fibers with or without permanent press or other resin finish are unusually difficult to clean in a conventional laundering operation. More particularly, polyester — cottons are especially susceptible to oily stains that become deeply set and are not easily removed. The polyester fibers are relatively hydrophobic and the conventional water laundering systems cannot penetrate the fabric to reach the stain and effect its removal.

Drycleaning is being used to remove these deeply set grease stains from treated or untreated mixed fiber blends, but drycleaning suffers from the disadvantage that it is relatively much more expensive than laundering and drycleaning does not readily remove the water soluble portion of the soil which is usually present in large quantities.

I have conceived a process of treating textile fabrics in the last step in a laundering process in such a way that greasy soil stains do not become deeply and permanently attached and are readily removed in subsequent laundering operations. The essence of my discovery is the temporary impregnation of the fabrics with an acrylic resin. The acrylic resin provides a means for flushing away subsequently acquired stains in the next laundering of the fabric. The resins are not permanently attached to the fabric and are generally nearly all removed in the next laundering. To the extent that the resins are not all removed in the next laundering they remain to assist in the removal of after acquired stains. Most of the applied resin is removed in the next laundering of the fabric so that a new application of the resin must be made on each subsequent laundering to obtain and maintain optimum soil release capability.

In addition to the ability to resist and facilitate the removal of subsequently acquired stains, the resin treatment which I have discovered assists in the removal of previously acquired deeply imbedded stains. I have observed that after two or three resin treatments as hereinafter described, that deeply imbedded stains are effectively removed. Many fabrics which have been soiled so badly and which could not be cleaned by conventional laundering have been restored to normal service as a result of the application of successive treatments in accordance with my invention. Generally about three cycles of my process are required to restore a badly soiled garment. An unexpected benefit of my treatment is that the textile fabric so treated has a distinctly improved hand, size and texture, rendering them easier to finish and more aesthetically appealing.

The essence of my invention is the discovery that acrylic resins of the types hereinafter disclosed may be applied to textile fabrics as a part of a final stage of a laundering operation whereby there is achieved a very low level of resin impregnation in the fabric. The impregnation of the acrylic resins on the textile fabrics is on the order of 0.005 to 0.05 percent by weight on a dry basis. A preferred amount is 0.01 to 0.2 percent by weight. It was an unexpected discovery to learn that this low level of resin impregnation would assist in the removal of deeply imbedded stains and give a textile fabric the ability to resist subsequently acquired stains. It was also unexpected to discover that repeated treatments of the fabrics with a low level of acrylic resin impregnation would give fabrics a soil release capability and desirable finish which, although only temporary, is equivalent in performance to the much more expensive process whereby the soil release resins are permanently attached to textiles by chemical means in the textile manufacturing process.

RESINS

The resins suitable for practicing this invention are all derived from homopolymers and copolymers of acrylic acid and methacrylic acid.

The homopolymers which form suitable soil release resins are polyacrylic acid and polymethacrylic acid. Either homopolymer or mixtures of the homopolymers provide satisfactory soil release resins for textile fabrics in my process.

In addition to the homopolymers described above, various copolymers formed by copolymerizing acrylic or methacrylic acid with alkyl esters of acrylic acid or methacrylic acid are satisfactory soil release resins. In these copolymers the mole ratio of acrylic acid or methacrylic acid to the alkyl esters of acrylic acid or methacrylic acid must be at least 1 to 1 in order to provide water solubility or water dispersibility of the copolymer. Any ratio of acid to ester greater than 1 to 1 including the acid homopolymers provide suitable soil release resins. The alkyl substituents are $C_1$ through $C_4$ groups. Mixtures of these copolymers are also satisfactory temporary soil release resins.

Esters suitable for copolymerizing with acrylic acid or methacrylic a acid to provide satisfactory temporary soil release resins are methyl acrylate, ethyl acrylate, n-propyl acrylate, isopropyl acrylate, n-butyl acrylate, iosbutyl acrylate, methyl methacrylate, ethyl methacrylate, n-propyl methacrylate, isopropyl methacrylate, n-butyl methacrylate and isobutyl methacrylate.

In addition to the copolymers described above which are useful temporary soil release resins, mixtures of the homopolymers with the various copolymers described above are particularly useful as temporary soil release resins.

Any ratio of mixtures of the homopolymers or mixtures of homopolymers and copolymers described above provides suitable temporary soil release resins for practicing my invention.

A preferred temporary soil release system comprises mixtures of the homopolymer of acrylic acid and copolymer formed from ethyl acrylate and methacrylic acid.

The above homopolymers and copolymers and their mixtures described above which provide satisfactory temporary soil release resins for fabrics in my new laundering process and compositions are hereinafter referred to in the specification and claims as acrylic resins.

The resin homopolymers and copolymers are conveniently added to the laundry machine in the form of water solutions, emulsions or dispersions. For example, polyacrylic acid is commercially available as 25 percent by weight aqueous solution. The acrylic resins are usually added directly to the souring solution in the laundry machine although the resin could be added to any reserve supply of souring solution.

SOURING SOLUTION

The souring solutions are acid solutions generally made from one of the fluosilicates such as sodium fluosilicate. The concentration of the resin in the souring solution is not critical. However, there must be present sufficient resin in the souring solution so that when the garment is dried there will remain on the fabric sufficient soil release resin to provide a means for removing soil and stains. Such a concentration of resin in the souring solution is known as an effective amount. Generally, the concentration of resin in the souring solution will be at 1 part of resin by weight per 5,000 parts of souring solution. Good results have been obtained at one-half part resin per 5,000 parts of souring solution, while some improvement in soil release properties has been obtained at one-fourth part of resin per 5,000 parts of souring solution.

Higher resin concentrations are generally not needed for garments receiving regular resin treatments. However, higher concentrations may be used for reclamation treatment of severly soiled garments. In this special treatment resin concentration in the sour may reach 3.0 parts of resin per 5,000 parts by weight of souring solution.

If resin impregnation of the fabric is performed separately from the sour operation, either combined with some other fabric finishing operation or carried out independantly, the concentration and pH of the resin in the separate treating solution must be the same as in the souring solution.

The souring operation in a commercial laundry is generally the last operation in the laundry process. For economic reasons, the application of the soil release resin is combined with the souring operation in order to avoid a separate laundry operation. However, if for some reason it is not desired to combine the sour and soil release impregnation treatment, they can be performed separately provided the resin treatment is the last operation in the laundry process. The resin impregnation must be the last operation to prevent loss of the resins by any subsequent laundering involving immersion in or rinsing of the fabrics with water which would wash away most of the resin.

The sour operation removes the alkalinity in the fabrics which is not removed by the water rinses. Generally from two to five water rinses are employed prior to souring. The first water rinse is usually at the wash temperature of 180° to 190°F. Subsequent rinses are at progressively lower temperatures down to room temperature. Failure to remove nearly all of the alkali can cause skin irritation from the fabric.

The sour solutions are prepared from acid salts and other acidic materials. The silicofluorides are the most common sours. The silicofluorides are obtained in the form of ammonium, sodium, magnesium or zinc fluosilicates. Other materials used in laundry sours are sodium and ammonium acid fluoride, ammonium chloride and acetic acid. Liquid sources of sours are hydrofluoric acid and fluosilicic acid.

The souring operation is generally done within a pH range of 4 to 6.5 and the amount of sour added will depend on the residual alkalinity from the washing cycle, the alkalinity of water being used and the desired pH. Generally from 1 oz. to 12 ozs. of sour are used per 100 lbs. of dry textile fabrics. Generally from 350 to 500 pounds of water are used in each laundry operation for each 100 pounds of dry fabrics.

The combined souring operation and application of the acrylic soil release resin to the fabrics is undertaken at a temperature within the range of 70° to 180°F. Preferably, the temperature will be within the range of 95°F and 180°F.

In combining the application of the sour and soil release resin to the fabrics, means must be taken to secure uniform mixing and suspension of the resin. The normal rotation of the laundry wheel is satisfactory for this purpose.

One or more of the following fabric finishing chemicals may be combined with the souring and resin application to the fabrics: Blueing is generally applied to white goods at the rate of one thirty-second oz. per 100 pounds of white goods; Fabric brighteners are applied at the rate of 1 oz. per 100 pounds of dry fabrics; Fabric softeners are applied to the sour solutions at the rate of 1½ to 2 ozs. per 100 pounds of dry fabrics.

Sizing is also compatible with the laundry souring solution and soil release resin. Sizing is generally wheat or corn starch and is used at a concentration of from 8 oz. to 1 lb. per 100 pounds of fabrics. Starch is applied to the souring at the same concentration. The above concentrations will provide an effective amount of fabric finishing agent. It will be appreciated that the concentration of fabric finishing agents in the souring solution are well known in the art. These concentrations will vary depending on local water conditions and the effect desired by the individual laundry operation.

DRYING

The souring operation combined with resin impregnation and/or other fabric finishing treatment takes place within about 3 to 10 minutes, preferably within 5 to 8 minutes. Following the treatment period in souring solution containing the acrylic resin the textile fabrics are separated from the treating solution and are then dried. Separation of the resin-sour solution is usually accomplished by centrifugal extraction or by hydraulic pressing.

There is generally retained on the fabric after separation of the souring solution or other fabric finishing solution about an equal weight of the treating solution. For every 100 pounds of dry clothes treated there will be about 100 pounds of sour solution. When the resin concentration in the sour is 1 part resin per 5,000 parts by weight of souring solution, then 100 pounds of clothes will have retained one-fiftieth of a pound of resin or 0.02 percent resin. When the resin concentration in the souring solution is one-fourth part resin to 5,000 parts by weight of souring solution, the resin retention on the fabrics is about 0.005 percent by weight. At one-half part resin per 5,000 parts by weight of souring solution, the resin impregnation on the fabrics after drying will be about 0.01 percent by weight. At 2½ parts resin per 5,000 parts of souring solution the resin impregnation' on the fabrics will be about 0.05 percent by weight. A preferred impregnation on the dry fabrics is about 0.01 to 0.02 percent by weight.

The wet resin impregnated fabrics are dried at temperatures varying from room temperature to about 350°F. Drying is accomplished in conventional air dryers for clothes or by ironing or by pressing. Ironing temperatures are generally about 350°F. Somewhat lower temperatures are generally used in the air dryers and satisfactory drying can be accomplished with air temperatures as low as about 70°F or room temperature. The water is more rapidly removed at higher temperatures and temperatures of 150° to 350°F are preferred.

The best mode of practicing my invention may be understood from a consideration of the following examples:

EXAMPLE 1

In a Milnor Washer, Model No. 600-CWM-5 of 35 pounds dry clothes capacity was placed 24 pounds of cotton rags and 1 pound of 10 inch square test swatches of white shirting, 65/35 polyester cotton finished with a durable press resin. The washer was filled with water to the 16 gal. level and 0.25 pounds of a commercial all-in-one laundry detergent was added. The water temperature was 150°F. After 10 minutes of agitation, the system was drained, refilled, and 0.125 pounds of detergent was added. It was agitated 5 minutes at 150°F. and then drained. There were four 30 gal. water rinses, one each at 150°F., 130°F., 110°F., and 90°F. After the four rinses, water was added to the 16 gal. level at 115°F., the pH adjusted to 4.5 by adding sodium fluosilicate laundry sour, and the system was agitated for 1 minute. At this time there was added 1 pint of an aqueous resin solution containing 3.9 percent by weight of a 25 percent by weight polyacrylic acid solution and 9.0 percent by weight of a 20 percent by weight solution of a copolymer of ethyl acrylate and metharcylic acid in the ratio of 2.7 mols metharcylic acid to 1 mol of ethyl acrylate. The one pint of resin solution provides 4.4 grams of polyacrylic acid and 8.7 grams of the copolymer. The system was agitated for 8 more minutes, drained, and centrifugely extracted for 1 minute. The cotton rags and test swatches were then dried by ironing for 15 seconds at 350°F.

The test swatches were soiled by placing on them at two separate spots, 5 drops of refined material oil and 5 drops of used motor oil. These spots were then blotted and allowed to age for a minimum of one half hour. The staining and rating procedure was the standard method of the American Association of Textile Chemists and Colorists, Test 130-1969.

Control swatches made from fabric identical to the test swatches were laundered in exactly the same manner as the foregoing procedure with the exception that no polymer and copolymer mixture was added to the souring step.

The control and the test swatches were then subjected to three additional cycles of laundering, treatment with polymer and copolymer solution, drying, and staining, the subsequent stains being placed at different locations on the test swatches. The test series was carried out with resin addition in each souring step, and the control series was carried out with no resin addition at any time.

Following each ironing, the color intensity of the spots was evaluated. Rating of 5 represents complete disappearance of spot.

The results after 4 cycles are given in Table 1.

stains. After four complete cycles the stains applied at the end of the first cycle were nearly completely gone in the case of the test fabrics treated with resin and were still distinctly visible in the case of the untreated control fabric.

EXAMPLE 2

In a Milnor Washer, Model No. 600-CWM-5 of 35 pounds capacity was placed 24 pounds of cotton rags and 1 pound of 10 inch square swatches of white shirting, 65/35 polyester cotton finished with a durable press resin. The washer was filled with water to the appropriate level and 0.25 pounds of a commercial all-in-one laundry detergent was added. The water temperature was 150°F. After 10 minutes of agitation, the system was drained, refilled, and 0.125 pounds of detergent was added. It was agitated 5 minutes at 150°F and then drained. There were four high level rinses, one each at 150°F, 130°F, 110°F, and 90°F. The water was raised to the low level (16 gal.) at 120°F. Three pints of the aqueous resin solution of Example 1 were added to the water. The resultant pH was 6.1. The system was agitated for 5 minutes, drained and centrifugely extracted for 1 minute. The cotton rags and test swatches were then air dried at 73°F for 2½ hours.

The test swatches were soiled by placing on them at two separate spots, 5 drops of refined mineral oil and 5 drops of used motor oil. These spots were then blotted and allowed to age for a minimum of one half hour.

Control swatches were prepared in exactly the same manner except that no resin mixture was added in the last step. The results after one wash, then application of soil release resin, then staining, then one additional wash showed control values of 3.5+ and 2.5 for mineral oil and motor oil respectively, and test value of 3.5+ and 3.0 for the respective stains on the resin treated fabric.

TABLE 1

|  | Spots Applied End of 1st Cycle | | Spots Applied End of 2nd Cycle | | Spots Applied End of 3rd Cycle | |
| --- | --- | --- | --- | --- | --- | --- |
|  | Mineral Oil | Motor Oil | Mineral Oil | Motor Oil | Mineral Oil | Motor Oil |
| Test Swatches | 5.0 | 4.5 | 4.5+ | 4.0 | 4.5 | 3.5+ |
| Control | 4.5+ | 3.0 | 4.0+ | 3.0 | 4.0+ | 2.5 |

After the first laundering following treatment with resin and staining, the stains on the treated fabric were seen to be slightly lighter than the stains on the untreated fabric. That is, the laundering stage following resin treatment was more effective in removing the

EXAMPLE 3

The test and control experiments of Example 1 were carried out varying the temperature of the solution in which the soil release polymer was applied to the textile. These experiments are recorded in Table II.

TABLE II

| | Grading at the Completion of Four Cycles of Spots Applied at the End of 1st Cycle Then Subjected to Three Full Cycles of Treatment | | | | | | | | | | | |
| --- | --- | --- | --- | --- | --- | --- | --- | --- | --- | --- | --- | --- |
| Temperature of Souring & Application Solution | 70°F | | 85°F | | 95°F | | 115°F | | 140°F | | 180°F | |
| | Min. Oil | Mot. Oil | Min. Oil | Mot. Oil | Min. Oil | Mot. Oil | Min. Oil | Mot. Oil | Min. Oil | Mot. Oil | Min. Oil | Mot. Oil |
| Test Swatches | 5.0 | 3.0+ | 4.5+ | 3.0+ | — | 4.5+ | 5.0 | 4.5+ | 5.0 | 4.0 | 5.0 | 4.0 |
| Control | 3.5+ | 3.0 | 4.0 | 2.5+ | — | 3.0 | 4.5+ | 3.0+ | 4.5+ | 3.0 | 4.5+ | 3.0 |

It is seen that even at an application solution temperature as low as 70°F. there is a small effect of the polymer treatment. More pronounced effect is obtained at 95°F. and higher.

EXAMPLE 4

The test and control experiments of Example 1 were carried out, except that the damp test swatches, after centrifugal extraction, were tumbled in a hot air dryer at 150°F. Following are the results after 4 cycles of resin impregnation treatments with comparative controls.

TABLE III

|  | Spots Applied End of 1st Cycle | | Spots Applied End of 2nd Cycle | | Spots Applied End of 3rd Cycle | |
|---|---|---|---|---|---|---|
|  | Mineral Oil | Motor Oil | Mineral Oil | Motor Oil | Mineral Oil | Motor Oil |
| Test Swatches | 4.5+ | 4.5+ | 4.5+ | 4.0+ | 4.5 | 3.5+ |
| Control | 4.5 | 2.5+ | 4.0+ | 2.5+ | 4.0+ | 2.5 |

EXAMPLE 5

In a Milnor Washer, Model No. 600-CWM-5 of 35 pounds capacity was placed 24 pounds of cotton rags and 1 pound of 10 inch square swatches of white shirting, 65/35 polyester cotton finished with a durable press resin. The washer was filled with water to the appropriate level and 0.25 pounds of a commercial all-in-one laundry detergent was added. The water temperature was 150°F. After 10 minutes of agitation, the system was drained, refilled, and 0.125 pounds of detergent was added. It was agitated 5 minutes at 150°F and then drained. There were four high level rinses, one each at 150°F, 130°F, 110°F, and 90°F. Then water was raised to the low level (16 gal.) at 120°F. The pH was adjusted to 4.1 by addition of ammonium fluosilicate sour and then 5 oz. of wheat starch were added to the souring solution. After 1 minute of agitation, there was added 1 pint of the resin solution described in Example 1. The system was agitated 8 more minutes, then centrifugely extracted for 1 minute. The textile fabrics were then tumble dried in a hot air drier at 200°F. air temperature.

The test swatches were soiled by placing on them at two separate spots, 5 drops of refined mineral oil and 5 drops of used motor oil. These spots were then blotted and allowed to age for a minimum of one half hour.

Control swatches were prepared in exactly the same manner as the foregoing procedure with the exception that no polymer and copolymer mixture was added to the souring step.

The control and the test swatches were then subjected to three additional cycles of laundering, treatment with polymer and copolymer solution, drying, and staining, the subsequent stains being place at different locations on the test swatches. The test series was carried out with polymer addition in each souring step, and the control series was carried out with no polymer addition at any time.

The results after 4 cycles of treatment are given in Table IV.

TABLE IV

|  | Spots Applied End of 1st Cycle | | Spots Applied End of 2nd Cycle | | Spots Applied End of 3rd Cycle | |
|---|---|---|---|---|---|---|
|  | Mineral Oil | Motor Oil | Mineral Oil | Motor Oil | Mineral Oil | Motor Oil |
| Test Swatches | 5.0 | 3.0+ | 5.0 | 3.0+ | 5.0 | 3.0+ |
| Control | 4.5+ | 3.0 | 4.5+ | 2.5+ | 5.0 | 2.5 |

EXAMPLE 6

The experiment of Example 1 was carried out in which varying amounts of sodium fluosilicate souring agent were used to achieve various pH of the system in which the soil release polymers were applied to the textile. The results are tabulated in Table V.

TABLE V

| | Grading at the Completion of the Second Cycle of Spots Applied at End of 1st Cycle Then Subjected to One Full Cycle of Treatment | | | | | | | | | | | |
|---|---|---|---|---|---|---|---|---|---|---|---|---|
| pH of Application Solution | 7.9 | | 7.4 | | 6.9 | | 6.1 | | 5.8 | | 4.5 | |
| | Min. Oil | Mot. Oil | Min. Oil | Mot. Oil | Min. Oil | Mot. Oil | Min. Oil | Mot. Oil | Min. Oil | Mot. Oil | Min. Oil | Mot. Oil |
| Test Swatches | 3.5 | 2.0+ | 3.5 | 2.5 | 3.5+ | 2.5 | 3.5+ | 3.0 | 4.0 | 3.0+ | 4.5 | 3.5+ |
| Control | 3.5 | 2.0 | 3.5+ | 2.5 | 3.5+ | 2.5 | 3.5+ | 2.5 | 3.5+ | 2.5 | 4.0 | 2.5 |

It is observed that improved soil removal as compared to the control is obtained at a treating solution pH of about 6.5 to a pH of about 4. At a pH lower than 4, the solution will produce fabric tendering and other undesirable side effects and is not normally used in commercial laundering. A preferred pH range is observed between about 4.5 and 5.8.

EXAMPLE 7

The procedure of Example 1 was carried out with a variety of textiles. These included 65/35 polyester cotton with crease resistant finish, rayon, pure cotton, silk, nylon, pure polyester (Dacron), wool and acrylic fabrics. In every case there was an improvement in soil removal versus the control except that motor oil stain removal on rayon was improved only very slightly.

EXAMPLE 8

An aqueous solution containing approximately 3.9 percent by weight based on the solution of a 25 percent by weight aqueous solution of polyacrylic acid, and 9.6 percent by weight based on the solution of a 20 percent by weight solution of a copolymer (27 mole percent ethyl acrylate, and 73 mole percent methacrylic acid), was packaged with fluorocarbon propellent in a pressure container. This mixture was sprayed onto clean dry crease-resistant, 65/35 polyester textile until the textile was slightly damp to the touch. The wet weight increase was approximately 3 percent of the dry weight, equivalent to a polymer add-on of about 0.09 percent of the dry textile. The textile swatch was subsequently dried by ironing at 360°F, stained with 5 drops of motor oil, aged for at least one-half hour and then laundered in a home washing machine with a conventional home laundry detergent at 110°F. After removal from the washing machine the damp swatches were dried, sprayed again with the polymer solution, then redried at ambient temperature. After 4 cycles of treatment, the swatches sprayed with polymer solution showed a motor oil stain rating of 3.5+ compared with 3.0+ for the control, and a mineral oil stain rating of 5.0 compared with 3.0+ for the control.

EXAMPLE 9

The procedure of Example 1 was carried out in which the ratio of the mixture of polymer solutions added to the souring solution was varied. The results of the experiments are reported in Table VI. Percentages are by weight.

TABLE VI

| Composition of Polymer Solution (one pint per 25 lb. load) | 13.5% of a 25% solution of polyacrylic acid in water | | 6.5% of a 25% solution of polyacrylic acid in water together with 6.5% of a 20% copolymer* solution in water | | 3.9% of a 25% solution of polyacrylic acid in water together with 9.6% of a 20% copolymer* solution in water | | 13.5% of a 20% copolymer* solution in water | |
|---|---|---|---|---|---|---|---|---|
| | Min. Oil | Mot. Oil | Min. Oil | Mot. Oil | Min. Oil | Mot. Oil | Min. Oil | Mot. Oil |
| Control | 4.0 | 2.5+ | 4.0+ | 2.5 | 4.0+ | 3.0 | 4.0 | 2.0+ |

* copolymer of ethylacrylate and methacrylic acid in mole ratio of 1 to 2.7.

It is observed that improved stain removal versus the control is obtained at all ratios.

EXAMPLE 10

The procedure of Example 1 was carried out except that the amount of soil release polymer added to the souring solution was varied. Results are reported in Table VII.

TABLE VII

| Amount of Polymer Solution Added | ¼pt./25 lbs. Textile | | ½pt./25 lbs. Textile | | 1 pt./25 lbs. Textile | | 2 pt./25 lbs. Textile | |
|---|---|---|---|---|---|---|---|---|
| | Min. Oil | Mot. Oil | Min. Oil | Mot. Oil | Min. Oil | Mot. Oil | Min. Oil | Mot. Oil |
| Test Swatches | 4.5+ | 3.0+ | 5.0 | 3.5+ | 5.0 | 4.5+ | 5.0 | 4.5+ |
| Control | 5.0 | 3.0 | 4.5+ | 3.0 | 4.5+ | 3.0+ | 4.5+ | 3.0+ |

It is seen that slight results are obtained when as little as one-fourth pint of polymer solution is added per 25 pound load. Good improvement is obtained at one-half pint per 25 pounds and optimum results are obtained with 1 or more pints per 25 pound load.

EXAMPLE 11

The experiment and procedure of Example 1 is repeated in which the ratio of ethyl acrylate to methacrylic acid in the copolymer is varied. In general, good results are obtained if the copolymer contains more than about 1 mole of methacrylic acid per mole of ethyl acrylate since the copolymer will be water soluble or dispersible. Conversely, if the copolymer contains less than about 1 mole of methacrylic acid per mole of ethyl acrylate the copolymer will be essentially insoluble and will therefore be ineffective in the practice of this invention. Compositions up to and including pure polymethacrylic acid will perform well.

EXAMPLE 12

The experiment of Example 1 was carried out, except that cotton and 65/35 unfinished polyester/cotton were used as fabrics, and a commercially available sizing containing starch was added at the rate of 4 ounces per 25 pounds of textile to the souring solution together with the polymer solution.

washer at the 6 inches level at 120°F. Six ounces of sodium silicofluoride sour and 36 ounces of starch-based sizing agent were added and allowed to distribute through a 2 minute agitation. Then 6 quarts of polymer solution containing 3.9 percent by weight of a 25 percent by weight aqueous solution of polyacrylic acid together with 9.6 percent weight of a 20 percent weight copolymer of ethyl acrylate and methacrylic acid in the

TABLE VIII

| | Spot Applied End of 1st Cycle Observed End of 2nd Cycle | | Spot Applied End of 1st & 2nd Cycle Observed End of 3rd Cycle | | | |
|---|---|---|---|---|---|---|
| | Mineral Oil | Motor Oil | Mineral Oil | | Motor Oil | |
| Spot No. | 1 | 1 | 1 | 2 | 1 | 2 |
| Cotton (test) | 4.5+ | 3.0 | 5.0 | 4.5 | 4.0+ | 3.0+ |
| Cotton (control) | 4.0+ | 3.0 | 4.5+ | 4.5 | 3.5+ | 3.0+ |
| Unfinished poly. cotton (test) | 4.5 | 3.0+ | 5.0 | 4.5 | 3.5+ | 3.5+ |
| Unfinished poly cotton (control) | 4.0+ | 2.5 | 4.0+ | 4.0 | 3.0 | 2.5 |

| | Spot Applied End of 1st, 2nd & 3rd Cycles Observed End of 4th Cycle | | | | | |
|---|---|---|---|---|---|---|
| | Mineral Oil | | | Motor Oil | | |
| Spot No. | 1 | 2 | 3 | 1 | 2 | 3 |
| Cotton (test) | 5.0 | 5.0 | 4.5 | 4.5+ | 4.0 | 3.5 |
| Cotton (control) | 5.0 | 4.5+ | 4.5+ | 4.0 | 3.5+ | 3.5 |
| Unfinished poly. cotton (test) | 5.0 | 5.0 | 4.0+ | 4.0 | 4.0 | 3.5 |
| Unfinished poly. cotton (control) | 4.5+ | 4.5 | 4.0 | 3.0 | 2.5+ | 2.5 |

EXAMPLE 13

Blue industrial work uniforms from an automotive repair shop, both shirts and pants, were loaded into a stainless steel washer 42 inches in diameter by 84 inches long. This washer was loaded with 200 pounds of permanent press finished 65/35 polyester content blend garments. Hot water was added to the washer to the level of 6 inches (170 gallons) at a temperature of 190°F. The garments were agitated by rotation of the washer for 6 minutes to remove loose grease and soil, and the water was removed from the washer.

For the next step, water was added to the washer to the same level at 190°F, and 6 pounds of alkaline all-in-one laundry detergent was added. There was also added 3 pints of emulsifiable kerosene to improve detergency. After 20 minutes of agitation, the washer was emptied. The washer was filled again to the same level with water at the same temperature, and the clothes were agitated without the addition of supplies and then subsequently drained. The washer was filled again to the same level and temperature. Three pounds of the alkaline detergent and 1½ pints of emulsifiable kerosene was added and the system was agitated for 15 minutes.

After draining this system there followed 5 rinse stages. In each of these stages, water was added to 12 inches level (262 gallons), then dumped after 2 minutes of agitation. The temperature in each of these 5 rinses was lowered in uniform steps from the original 190°F to a final rinse at 120°F.

For the final operation, water was drawn into the mole ratio of 1 to 2.7 in water was added and the system agitated for eight additional minutes. The washer was then drained and the garments extracted in a hydraulic extractor. The garments were eventually tumbled dry in a hot air dryer at 180°F.

For purposes of this test, garments from an automotive repair shop were washed in the manner described and then returned to service on a 2 week cycle basis. After six months, that is 12 washing treatments and use cycles, the garments were seen to have only a few light residual stains, and were considered top quality in terms of overall appearance.

Control experiments were simultaneously conducted with identical garments used in automotive repair which were subjected to exactly the same laundering cycles with the exception that polymer solution was not added to the souring solutions. At the end of 6 months of service these garments were generally dingy in appearance and contained numerous dark grease stains. Approximately 20 percent of the garments were considered aesthetically unacceptable and had to be scrapped.

EXAMPLE 14

The unacceptable heavily soiled garments left from the "control" part of Example 13 were laundered in exactly the same manner as in Example 13 except that 12 quarts of polymer solution containing 3.9 percent by weight of a 25 percent by weight aqueous solution of polyacrylic acid together with 9.6 percent weight of a 20 percent weight copolymer of ethyl acrylate and methacrylic acid in the mole ratio of 1 to 2.7 in water were added in the souring solutions. After two subsequent launderings and polymer treatment there was seen to be a distinctly measurable improvement in appearance. After 4 cycles of treatment with polymer followed by laundering (without intervening use), most of these garments were so free of stains and generally improved in appearance that they were returned to regular service. There was still further improvement in appearance upon as many as six cycles of polymer treatment and laundering, but little further improvement with more cycles of treatment than that.

EXAMPLE 15

The following copolymer compositions can be prepared by standard aqueous polymerization technique:

| ESTER | ACID | MOLE RATIO ACID/ESTER |
|---|---|---|
| Butyl acrylate | Methacrylic Acid | 6.0/1 |
| Methyl acrylate | Acrylic Acid | 2.5/1 |
| Isopropyl acrylate | Methacrylic Acid | 1.5/1 |
| Butyl acrylate | Acrylic Acid | 9.0/1 |
| Ethyl methacrylate | Acrylic Acid | 15.0/1 |
| Butyl methacrylate | Methacrylic Acid | 6.0/1 |
| Methyl methacrylate | Acrylic Acid | 3.0/1 |

These copolymers are useful as temporary soil release resins in the practice of my invention.

EXAMPLE 16

The experiment of Example 1 was carried out except that there was added to the souring solution 8 ozs. of a 2 percent by weight solution of a quaternary ammonium type fabric softener prior to the addition of the acrylic resin to the souring solution. The softener agent was 2-heptadecyl-1-methyl-1((2-stearoylamide)-ethyl)-imadazolinium methyl sulfate.

The comparative test and control swatches are shown in Table IX.

TABLE IX

|  | Spots Applied End of 1st Cycle | | Spots Applied End of 2nd Cycle | | Spots Applied End of 3rd Cycle | |
|---|---|---|---|---|---|---|
|  | Mineral Oil | Motor Oil | Mineral Oil | Motor Oil | Mineral Oil | Motor Oil |
| Test Swatches | 5.0 | 4.0+ | 5.0 | 4.0+ | 5.0 | 4.0 |
| Control | 5.0 | 3.5 | 5.0 | 3.0 | 5.0 | 3.0 |

I claim:
1. The process of treating a textile fabric with an acrylic resin to obtain temporary soil release comprising spraying the fabric with acrylic resin in an aqueous medium containing from about ¼ to about 3 parts of acrylic resin per 5000 parts of water and thereafter drying the fabric to remove water without curing the resin.
2. The process of claim 1 in which the acrylic resin is selected from one or more of the resins consisting of polyacrylic acid, polymethacrylic acid and copolymers of acrylic acid or methacrylic acid with alkylesters of acrylic acid and methacrylic acid said alkyl groups being limited from 1 to 4 carbon atoms.
3. The process of claim 2 in which the resin is carried in spray form by a propellent selected from the class consisting of air, carbon dioxide, hydrocarbons and fluorocarbons.
4. The process of claim 1 in which the aqueous acrylic resin also contains one or more fabric finishing chemicals.

* * * * *

UNITED STATES PATENT OFFICE
CERTIFICATE OF CORRECTION

Patent No. 3,900,606     Dated August 19, 1975

Inventor(s) Harry Creston Mandell, Jr.

It is certified that error appears in the above-identified patent and that said Letters Patent are hereby corrected as shown below:

Table VI, Column 12, before the line starting with "Control" should be inserted the following:

Test Swatches    4.0+    3.0    4.0+    3.0+    4.5+    4.0    4.0    3.0+

Signed and Sealed this twenty-fifth Day of November 1975

[SEAL]

Attest:

RUTH C. MASON
*Attesting Officer*

C. MARSHALL DANN
*Commissioner of Patents and Trademarks*